(12) United States Patent
Huang et al.

(10) Patent No.: US 12,375,317 B2
(45) Date of Patent: Jul. 29, 2025

(54) INTEGRATING MEETING DATA BETWEEN AN IM APPLICATION AND A CONFERENCING APPLICATION

(71) Applicant: Tencent Technology (Shenzhen) Company Limited, Guangdong (CN)

(72) Inventors: Tieming Huang, Shenzhen (CN); Xiaoqin Wang, Shenzhen (CN); Qiang Huang, Shenzhen (CN); Bin Li, Shenzhen (CN); Lei Li, Shenzhen (CN); Chuwei Zeng, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 5 days.

(21) Appl. No.: 18/517,988

(22) Filed: Nov. 22, 2023

(65) Prior Publication Data

US 2024/0089137 A1 Mar. 14, 2024

Related U.S. Application Data

(63) Continuation of application No. PCT/CN2023/072152, filed on Jan. 13, 2023.

(30) Foreign Application Priority Data

Mar. 2, 2022 (CN) .......................... 202210199674.3

(51) Int. Cl.
*H04L 12/18* (2006.01)
*H04L 51/04* (2022.01)
(Continued)

(52) U.S. Cl.
CPC ...... *H04L 12/1827* (2013.01); *H04L 12/1818* (2013.01); *H04L 12/1822* (2013.01);
(Continued)

(58) Field of Classification Search
CPC ............. H04L 12/1827; H04L 12/1818; H04L 12/1822; H04L 51/04; H04L 51/046; H04L 65/403
See application file for complete search history.

(56) References Cited

U.S. PATENT DOCUMENTS

| 2002/0118809 A1 | 8/2002 | Eisenberg |
| 2013/0094671 A1* | 4/2013 | Zhou .................. H04L 12/1818 709/204 |

(Continued)

FOREIGN PATENT DOCUMENTS

CN 112235121 A * 1/2021 ......... H04L 12/1818

OTHER PUBLICATIONS

Extended European Search Report and Search Opinion received for European Application No. 23762681.7, mailed on May 19, 2025, 10 pages.

*Primary Examiner* — Tonia L Dollinger
*Assistant Examiner* — Joseph M Cousins
(74) *Attorney, Agent, or Firm* — ArentFox Schiff LLP (57) ABSTRACT

A conference data processing method includes acquiring a first meeting list of meetings created by a user, meetings in the first meeting list having been created by the user through an instant messaging (IM) client. The IM client includes an interface for calling a software development kit (SDK) of a separate conference application implementing at least one of audio or video conferencing. The method further includes requesting, through a fusion server, a server of the conference application to create a second meeting list according to the first meeting list, and receiving, through the fusion server, the second meeting list transmitted by the server of the conference application. The second meeting list includes meetings that correspond respectively to the meetings in the first meeting list. The method further includes establishing (Continued)

an association relationship between a meeting in the first meeting list and a meeting in the second meeting list.

20 Claims, 5 Drawing Sheets

(51) Int. Cl.
  *H04L 51/046* (2022.01)
  *H04L 65/403* (2022.01)
(52) U.S. Cl.
  CPC ............ *H04L 51/04* (2013.01); *H04L 51/046* (2013.01); *H04L 65/403* (2013.01)

(56) References Cited

U.S. PATENT DOCUMENTS

2018/0070127 A1* 3/2018 Kumar ............... H04N 21/2365
2020/0313918 A1* 10/2020 VanBlon ............... H04L 65/403

\* cited by examiner

FIG. 1

| Determine that a conference data update trigger condition is satisfied and acquire a first reservation conference list of a target user being a conference creator, a reservation conference in the first reservation conference list being a reservation conference created by the target user through a history of an IM client, the IM client being provided with an interface for calling an SDK of a target application, and the target application being an application with an audio-video conference function | S101 |

| Request, through a fusion server, a server of the target application to create a second reservation conference list, the second reservation conference list being created according to the first reservation conference list | S102 |

| Receive, through the fusion server, the second reservation conference list transmitted by the server of the target application | S103 |

| Establish an association relationship between the reservation conference in the first reservation conference list and a reservation conference in the second reservation conference list, and set an updated identification for each reservation conference in the first reservation conference list | S104 |

FIG. 7

INTEGRATING MEETING DATA BETWEEN AN IM APPLICATION AND A CONFERENCING APPLICATION

RELATED APPLICATIONS

This application is a continuation of International Application No. PCT/CN2023/072152, filed on Jan. 13, 2023, which claims priority to Chinese Patent Application No. 202210199674.3 with an application date of Mar. 2, 2022. The disclosures of the prior applications are hereby incorporated by reference in their entirety.

FIELD OF THE TECHNOLOGY

The embodiments of this application relate to the technical field of communications, including a conference data processing method, apparatus, and device, and a storage medium.

BACKGROUND OF THE DISCLOSURE

Instant messaging (IM) refers to an application capable of instantly sending and receiving Internet messages and the like. With the development of the mobile Internet, IM technology, with its deep update with Internet socialization, makes a variety of IM applications widely used. At the same time, with the popularization of office digitalization and networking, as well as the increase in the mobility of people's work and study, more and more enterprises use audio-video conferences to support telecommuting and applications with audio-video conference functions are widely used.

SUMMARY

This disclosure provides a conference data processing method, apparatus, and device, and a storage medium, to realize fusing conference data of two different applications with an audio-video conference function into one kind of conference data, facilitating a user to use an audio-video conference function intercommunicated between the two applications.

In an embodiment, a conference data processing method includes acquiring a first meeting list of meetings created by a user, meetings in the first meeting list having been created by the user through an instant messaging (IM) client. The IM client includes an interface for calling a software development kit (SDK) of a separate conference application implementing at least one of audio or video conferencing. The method further includes requesting, through a fusion server, a server of the conference application to create a second meeting list according to the first meeting list, and receiving, through the fusion server, the second meeting list transmitted by the server of the conference application. The second meeting list includes meetings that correspond respectively to the meetings in the first meeting list. The method further includes establishing an association relationship between a meeting in the first meeting list and a meeting in the second meeting list.

In an embodiment, a conference data processing apparatus includes processing circuitry configured to acquire a first meeting list of meetings created by a user, a meetings in the first meeting list having been created by the user through an instant messaging (IM) client. The IM client includes an interface for calling a software development kit (SDK) of a separate conference application implementing at least one of audio or video conferencing. The processing circuitry is further configured to request, through a fusion server, a server of the conference application to create a second meeting list according to the first meeting list, and receive, through the fusion server, the second meeting list transmitted by the server of the conference application. The second meeting list includes meetings that correspond respectively to the meetings in the first meeting list. The processing circuitry is further configured to establish an association relationship between a meeting in the first meeting list and a meeting in the second meeting list.

In an embodiment, a non-transitory computer-readable storage medium stores computer-readable instructions thereon, which, when executed by processing circuitry, cause the processing circuitry to perform a conference data processing method. The conference data processing method includes acquiring a first meeting list of meetings created by a user, meetings in the first meeting list having been created by the user through an instant messaging (IM) client. The IM client includes an interface for calling a software development kit (SDK) of a separate conference application implementing at least one of audio or video conferencing. The method further includes requesting, through a fusion server, a server of the conference application to create a second meeting list according to the first meeting list, and receiving, through the fusion server, the second meeting list transmitted by the server of the conference application. The second meeting list includes meetings that correspond respectively to the meetings in the first meeting list. The method further includes establishing an association relationship between a meeting in the first meeting list and a meeting in the second meeting list.

In summary, in this disclosure, by providing an interface for calling an SDK of a target application (the target application is an application having an audio-video conference function) in an IM client, the call of the target application by the IM client is realized, and thus when a user creates a reservation conference (meeting), the target application can be called to create the reservation conference, and the same user can view the same piece of reservation conference data in the IM client and the client of the target application. In addition, the IM server acquires a first reservation conference list created by the target user via the history of the IM client in determining that a conference data update trigger condition is satisfied; then a server requesting the target application via the fusion server creates a second reservation conference list according to the first reservation conference list, and after receiving the second reservation conference list forwarded through the fusion server, establishes an association relationship between the reservation conference in the first reservation conference list and the reservation conference in the second reservation conference list, and sets an updated identification for each reservation conference in the first reservation conference list, thereby updating the reservation conference created by the IM client before the IM client is not upgraded to the IM client with a fusion conference version to the reservation conference created by the IM client with a fusion conference version, to realize fusing conference data of two different applications with an audio-video conference function into one kind of conference data, so that the same user can view the same piece of reservation conference data in the IM client and the client of the target application. The user can select the IM client or the client of the target application to view reservation conference information or perform operations such as entering a conference according to needs to improve convenience; it is convenient for users to seamlessly use a conferencing function intercommunicated between the two applications.

BRIEF DESCRIPTION OF THE DRAWINGS

In order to explain the technical solutions of the embodiments of the present disclosure more clearly, the following description is given with reference to the drawings, which are to be used in the description of the embodiments. It is obvious that the drawings in the following description are only some embodiments of the present disclosure. The ordinarily skilled in the art would have been able to acquire other drawings according to these drawings.

DESCRIPTION OF EMBODIMENTS

The technical solutions in the embodiments of the present disclosure will be described below in conjunction with the drawings in the embodiments of the present invention. Obviously, the described embodiments are only a part of the embodiments of the present invention, and not all of them. All other embodiments obtained by persons of ordinary skill in the art based on the embodiments of the present invention shall fall within the protection scope of the present disclosure.

It should be noted that in the specification, claims, and the foregoing drawings of the present disclosure, the terms "first", "second", and so on are intended to distinguish between similar objects rather than indicating a specific order. It is to be understood that the data used are interchangeable under appropriate circumstances such that the embodiments of the present disclosure described herein are capable of operation in other sequences than those illustrated or otherwise described herein. Moreover, the terms "include", "contain", and any other variants mean to cover the non-exclusive inclusion, for example, a process, method, system, product, or the server that includes a list of steps or units is not necessarily limited to those expressly listed steps or units, but may include other steps or units not expressly listed or inherent to such a process, method, system, product, or device.

Before introducing the technical solutions of this disclosure, the relevant knowledge of this disclosure is described as follows:

1. Cloud technology refers to hosting technology for unifying a series of resources, such as hardware, software, and a network, in a wide area network or a local area network to realize the calculation, storage, processing, and sharing of data. Cloud technology is a general term for network technology, information technology, integration technology, management platform technology, and application technology based on cloud computing business model application, which can form a resource pool, be used as needed, and be flexible and convenient. Cloud computing will become an important support. Background services of technical network systems require a large amount of computing and storage resources, such as video websites, picture websites, and more portal websites. With the high development and application of the Internet industry, each item may have its own identification mark in the future, which needs to be transmitted to the background system for logical processing. The data of different levels will be processed separately. All kinds of industry data need strong system backing support, which can only be realized by cloud computing.

2. Cloud conference is an efficient, convenient, and low-cost conference form based on cloud computing technology. Users can quickly and efficiently share voice, data files, and video with teams and clients around the world by simply operating through an Internet interface, and cloud conference service providers can help users to operate through complex technologies such as data transmission and processing.

Cloud conferences mainly focus on the service content based on a software as a service (SaaS) mode, including telephone, network, video, and other service forms; a cloud computing-based video conference is called a cloud conference. In the cloud conference era, the transmission, processing, and storage of data are all processed by the computer resources of the video conference manufacturer, and users can carry out efficient remote conferences without purchasing expensive hardware and installing tedious software at all, and only need to open a browser and login the corresponding interface.

In the conference data processing method provided by the embodiment of this disclosure, the application with an audio-video conference function involved can be realized based on the above cloud technology, and particularly a powerful cloud computing capability and an audio-video technical capability in the cloud technology can be integrated; and the audio-video conference function can be realized based on communication software with the audio-video conference function.

An audio-video conference application has an audio-video conference function, and an IM application also has an audio-video conference function; how to fuse conference data of two different applications having an audio-video conference function into one type of conference data is convenient for a user to use the audio-video conference function intercommunicated between the two applications; the same user checks the same piece of reservation conference (meeting) data at an IM client and a client of a target application (an audio-video conference application); and the user can select an IM client or a client of a target application to perform operations such as entering a conference according to needs, to improve convenience, which is the technical problem to be solved by the embodiments of this disclosure.

In order to solve the above technical problem, this disclosure realizes the call of a target application by an IM client by setting an interface of an SDK used for calling the target application (the target application is a separate conference application with an audio-video conference function) in the IM client. In the embodiments of this disclosure, the IM client which is set with an interface of the SDK used for calling the target application is referred to as an IM client with a fusion conference version. For example, all the IM clients with a version of 4.0 or more are IM clients with a fusion conference version, and thus when a user creates a reservation conference using the IM clients with a fusion conference version, a target application can be called to create the reservation conference, and the same user can view the same piece of reservation conference data at the IM clients and the clients of the target application. However, when a user creates a reservation conference using an IM client with a non-fusion conference version (for example, an IM client below version 4.0), the original audio-video conference function creation of the IM client is used; since the IM application and the target application are two heterogeneous systems and each has a self-defined conference information structure after the IM client is upgraded to the IM client with the fusion conference version, reservation conference data created by the user before the IM client is not upgraded needs to be updated, to enable the same user to view the same piece of reservation conference data at the IM client and the client of the target application. In this disclosure, in order to further solve the technical problem, the IM server acquires a first reservation conference list created by the target user via the history of the IM client in determining that a conference data update trigger condition is satisfied; then a server requesting the target application via the fusion server creates a second reservation conference list according to the first reservation conference list, and after receiving the second reservation conference list forwarded through the fusion server, establishes an association relationship between the reservation conference in the first reservation conference list and the reservation conference in the second reservation conference list, and sets an updated identification for each reservation conference in the first reservation conference list, thereby updating the reservation conference created by the IM client before the IM client is not upgraded to the IM client with a fusion conference version to the reservation conference created by the IM client with a fusion conference version, so that the same user can view the same piece of reservation conference data in the IM client and the client of the target application. The user can select the IM client or the client of the target application to view reservation conference information (meeting information) or perform operations such as entering a conference according to needs to improve convenience.

Figure 1:
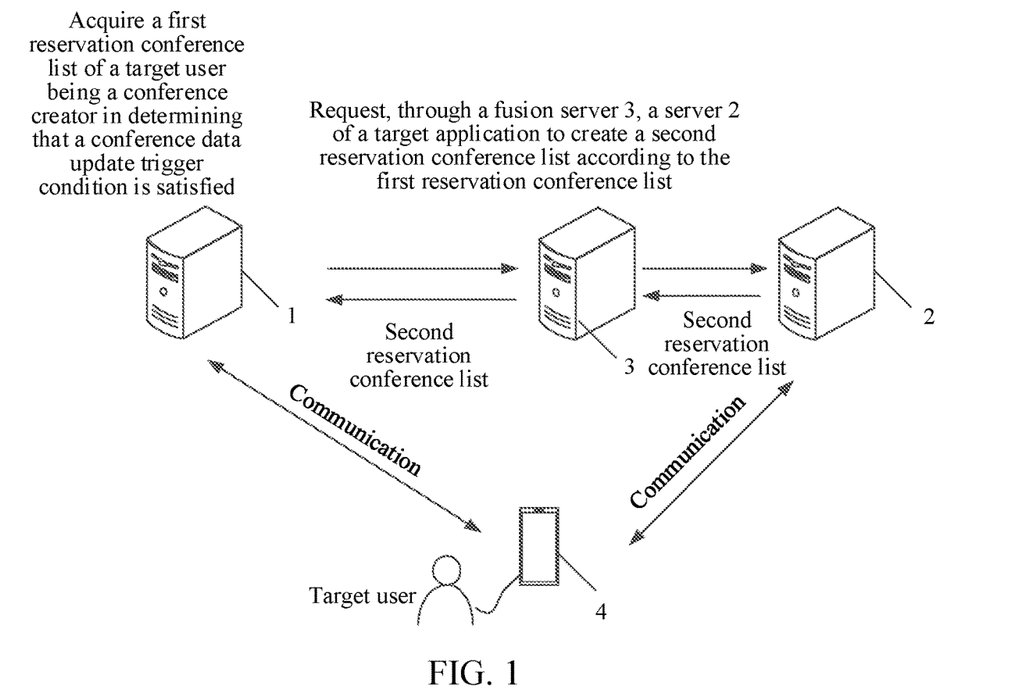
FIG. 1 is a diagram of a system architecture of a conference data processing method provided by an embodiment of this disclosure.

The technical solution of this disclosure will be described in detail as follows:

FIG. 1 is a diagram of a system architecture of a conference data processing method provided by an embodiment of this disclosure. As shown in FIG. 1, the system architecture may include an IM server 1, a server 2 of a target application, a fusion server 3, and a first terminal device 4. The target application is an application program with an audio-video conference function. The first terminal device 4 can be a personal computer, a notebook computer, an intelligent terminal, a tablet computer, a portable wearable device, and the like. The IM server 1, the server 2 of the target application, and the fusion server 3 may be an independent physical server, and may also be a server cluster or distributed system composed of a plurality of physical servers, and may further be a cloud server providing basic cloud computing services such as cloud services, cloud databases, cloud computing, cloud functions, cloud storage, network services, cloud communications, middleware services, domain name services, security services, content delivery network (CDN), as well as big data and artificial intelligence platforms.

An IM application client can be installed and run on the first terminal device 4, and the first terminal device 4 can communicate with the IM server 1 via a network. A target application client can also be installed and run on the first terminal device 4, and the first terminal device 4 can communicate with the server 2 of the target application via a network.

Illustratively, an IM application client can be installed and run on the first terminal device 4, and the IM client is provided with an interface for calling the SDK of the target application, so that the target application can be called to use the audio-video conference function of the target application, such as reserving a conference and initiating an immediate conference. As shown in FIG. 1, in an implementable manner, in an embodiment of this disclosure, an IM client provided with an interface for calling an SDK of a target application is referred to as an IM client with a fusion conference version, to realize updating a reservation conference created by the IM client before the IM client is not upgraded to the IM client with the fusion conference version to a reservation conference created by the IM client with the fusion conference version, so that the same user views the same piece of reservation conference data on the IM client and a client of the target application. In determining that a conference data update trigger condition is satisfied, the IM server 1 acquires a first reservation conference list of a target user being a conference creator, the reservation conference in the first reservation conference list being a reservation conference created by the target user via the IM client history, and requests the server 2 of the target application via the fusion server 3 to create a second reservation conference list according to the first reservation conference list, and then receives the second reservation conference list sent by the server of the target application via the fusion server, establishes an association relationship between a reservation conference in the first reservation conference list and a reservation conference in the second reservation conference list, and sets an updated identification for each reservation conference in the first reservation conference list. Thus, it is achieved to update a reservation conference created by the IM client before the IM client is not upgraded to the IM client with the fusion conference version to a reservation conference created by the IM client with the fusion conference version. The technical solutions of this disclosure will be described in detail with reference to the drawings.

The technical solutions of this disclosure and how the technical solutions of this disclosure solve the above technical problems are described in detail in the following specific embodiments. The following several specific embodiments may be combined with each other, and the same or similar concepts or processes may not be described repeatedly in some embodiments. The following describes the embodiments of this disclosure with reference to the drawings.

Figure 2:
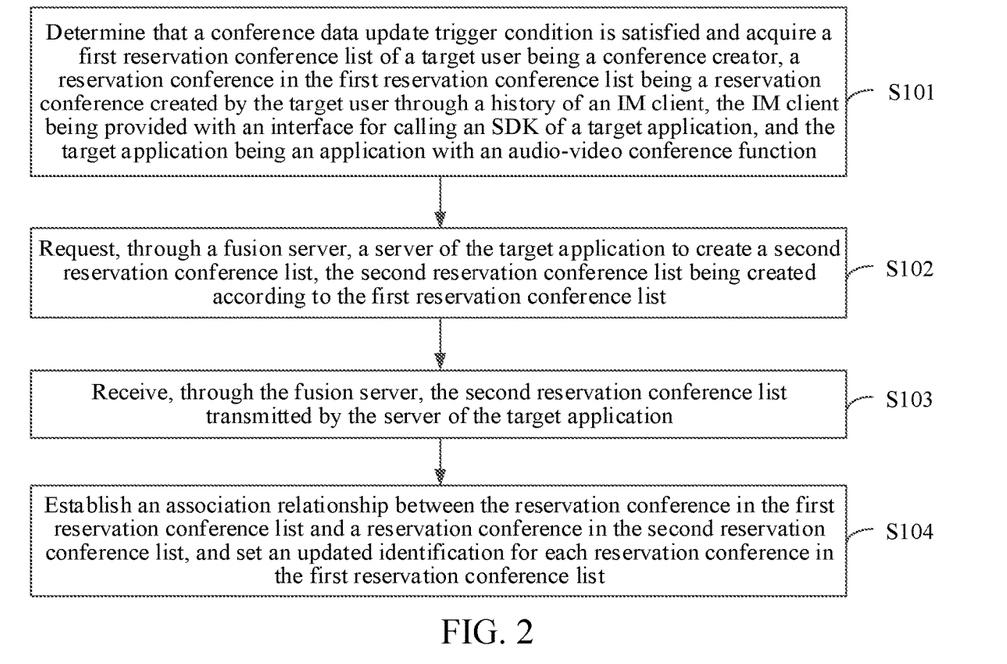
FIG. 2 is a flowchart of a conference data processing method provided by an embodiment of this disclosure.

FIG. 2 is a flowchart of a conference data processing method provided by an embodiment of this disclosure. As shown in FIG. 2, an executive body of the embodiment may be an IM server, and the method may include the following steps:

S101: Determine that a conference data update trigger condition is satisfied and acquire a first reservation conference list of a target user being a conference creator, a reservation conference in the first reservation conference list being a reservation conference created by the target user through a history of an IM client, the IM client being provided with an interface for calling an SDK of a target application, and the target application being an application with an audio-video conference function. For example, a first meeting list of meetings created by a user is acquired, meetings in the first meeting list having been created by the user through an instant messaging (IM) client. The IM client includes an interface for calling a software development kit (SDK) of a separate conference application implementing at least one of audio or video conferencing.

In an embodiment, an application with an audio-video conference function refers to an application having an audio conference function and/or a video conference function.

Specifically, in the embodiment, an interface for calling an SDK of a target application is provided in an IM client, and the interface may be an application programming interface (API) interface. In an embodiment, the IM application may be an IM application applied to the internal communication of an enterprise or a company. The target application is an application having an audio-video conference function.

In an implementable manner, a tab can be set in the IM client, and function prompt information such as "conference" can be displayed on the tab. A user clicks the tab; and in response to the operation of the user clicking the tab, the IM client initiates a call to a target application and displays an interface corresponding to the target application (such as the first page of the target application).

In the embodiment, an IM client is installed and run in a terminal device; a target user is a user who uses the terminal device; and a reservation conference in a first reservation conference list is a reservation conference created by the target user through an IM client history, specifically is a reservation conference created by the target user through the history of an audio-video conference function of the IM client itself. The first reservation conference list includes conference information for at least one reservation conference, which may include, for example, a conference identification (meeting identification), a conference participant user, a conference start time, a conference duration, and a conference room.

Before determining that a conference data update trigger condition is satisfied, the IM client in the embodiment does not set an interface for calling the SDK of the target application, and the IM client creates a reservation conference using its own audio-video conference function. In the embodiment, an IM client provided with an interface for calling an SDK of a target application is referred to as an IM client with a fusion conference version, for example, IM clients with a version of 4.0 or more are all IM clients with a fusion conference version; for example, a user creates a reservation conference using an IM client with a version of 3.0, and after a period of time, the user upgrades the IM client with a version of 3.0 to an IM client with a version of 4.0; at this time, it is necessary to update the reservation conference created by the user using the IM client of version 3.0, so that the user can complete the update of the reservation conference created by the user using the IM client of version 3.0 before using the conference-related functions of the IM client of version 4.0, without perception to the user.

In an implementable manner, in order to make a user not aware, there are three triggering opportunities for updating a reservation conference created by a target user via the history of an IM client in the embodiment, and correspondingly determining that a conference data update trigger condition is satisfied specifically includes the following three methods:

In method I, the determining that a conference data update trigger condition is satisfied may specifically be as follows:

It is determined that a conference data update trigger condition is satisfied in response to receiving a user login request sent by an IM client, the user login request carrying an identification of a target user and a version of the IM client and determining that the IM client is an IM client with a fusion conference version according to the version of the IM client.

Specifically, in one aspect, a new asynchronous logical branch may be added for updating the reservation conference created by the user history when the user logs on to the IM client.

Alternatively, it is determined that a conference data update trigger condition is satisfied in response to receiving a user login request sent by an IM client, the user login request carrying an identification of a target user and a version of the IM client, determining that the IM client is an IM client with a fusion conference version according to the version of the IM client, and determining that the target user has the permission of conference data update according to the identification of the target user.

Specifically, in this mode, compared with the above mode, the determination of determining whether a target user has permission to update conference data is added; for example, the function of an IM client with a fusion conference version is not released for all users, and some users can be selected for use by setting a permission switch.

In the embodiment, when it is determined that the target user logs in the IM client with the fusion conference version for the first time, the reservation conference created by the target user through the history of the IM client is updated, and the reservation conference data can be updated in a timely and unaware manner for the user.

In method II, the determining that a conference data update trigger condition is satisfied may specifically be as follows:

It is determined that a conference data update trigger condition is satisfied in response to receiving an SDK initialization request sent by an IM client, the SDK initialization request carrying an identification of a target user and determining that the IM client is an IM client with a fusion conference version according to the SDK initialization request.

Specifically, a tab can be set in the IM client with the fusion conference version, and function prompt information such as "conference" can be displayed on the icon. A user clicks the icon; and in response to the operation of the user clicking the icon, the IM client initiates a call to a target application and displays an interface corresponding to the target application (such as the first page of the target application). After the IM client is upgraded to the IM client with the fusion conference version, if the user clicks the tab for the first time, the SDK initialization will be triggered, and the IM client will send an SDK initialization request to the IM server. Alternatively, the SDK initialization may be periodic, for example, when the user clicks the tab for the first time, the SDK initialization is triggered; and when the user clicks the tab after a preset period, the SDK initialization is also triggered.

Alternatively, it is determined that a conference data update trigger condition is satisfied in response to receiving an SDK initialization request sent by an IM client, the SDK initialization request carrying an identification of a target user, determining that the IM client is an IM client with a fusion conference version according to the SDK initialization request, and determining that the target user has the permission of conference data update according to the identification of the target user.

Likewise, in this mode, compared with the above mode, the determination of determining whether a target user has permission to update conference data is added; for example, the function of an IM client with a fusion conference version is not released for all users, and some users can be selected for use by setting a permission switch.

In the embodiment, by updating the reservation conference created by the target user through the history of the IM client in determining the SDK initialization, the reservation conference data can be updated in a timely and unaware manner for the user.

When a user is actually used, for example, for some users, the setting of the permission switch is temporal, for example, when the user logs in the upgraded IM client, the user does not have permission to update conference data; but when the user starts to use the conference function in the upgraded IM client, the permission is released, and the user has the permission to update conference data, and at this time, the historical reservation conference to be started can be updated. Thus, the user can be timely updated with the reservation conference data without perception.

In method III, the determining that a conference data update trigger condition is satisfied may specifically be as follows:

It is determined, before transmitting a conference invitation ring (meeting invitation) of a target reservation conference (target meeting) to the IM client, whether the IM client is an IM client with a fusion conference version, the target reservation conference being a reservation conference arriving at a conference start time; and if it is determined that the IM client is an IM client with a fusion conference version, it is determined that a conference data update trigger condition is satisfied.

Specifically, the reservation conference created historically in the embodiment is a reservation conference to be started, and when the start time of a target reservation conference is reached, the IM server will send a conference invitation ring to an IM client where a participant user of the target reservation conference is located, to remind the participant user to join the target conference (target meeting). In the embodiment, when the start time of a target reservation conference is reached, before sending a conference invitation ring of the target reservation conference to an IM client, determining whether the IM client is an IM client with a fusion conference version, and if the IM client is the IM client with the fusion conference version, it is determined that a conference data update trigger condition is satisfied.

Alternatively, it is determined, before transmitting a conference invitation ring of a target reservation conference to the IM client, whether the IM client is an IM client with a fusion conference version, the target reservation conference (meeting) having an upcoming conference start time; and if it is determined that the IM client is an IM client with a fusion conference version and that the target user has the permission of conference data update, it is determined that a conference data update trigger condition is satisfied.

Likewise, in this mode, compared with the above mode, the determination of determining whether a target user has permission to update conference data is added; for example, the function of an IM client with a fusion conference version is not released for all users, and some users can be selected for use by setting a permission switch.

Alternatively, for an upgraded IM client, method I can be firstly used, then method II can be used, and then method III can also be used to determine whether a conference data update trigger condition is satisfied; for example, for some users, the setting of the permission switch is temporal, for example, when the user logs in the upgraded IM client, the user does not have the permission to update conference data; however, when a reservation conference is about to start, the permission is released, and the user has the permission to update conference data, and at this time, the historical reservation conference to be started can be updated. By increasing the trigger update opportunity of method III, the user can be updated with reservation conference data in a timely manner without perception, to avoid missing the update of reservation conference data when the user has permission.

S102: Request, through a fusion server, a server of the target application to create a second reservation conference list, the second reservation conference list being created according to the first reservation conference list. For example, a server of the conference application is requested, through a fusion server, to create a second meeting list according to the first meeting list.

S103: Receive, through the fusion server, the second reservation conference list transmitted by the server of the target application. For example, the second meeting list transmitted by the server of the conference application is received through the fusion server. The second meeting list includes meetings that correspond respectively to the meetings in the first meeting list.

Specifically, as an implementable manner, S102 may specifically be as follows:

transmitting a reservation conference creation request (meeting creation request) to the fusion server to cause the fusion server to transmit the reservation conference creation request to the server of the target application, the reservation conference creation request carrying the first reservation conference list.

Accordingly, S103 may specifically be as follows: receiving the second reservation conference list transmitted through the fusion server, the second reservation conference list being created for the server of the target application before being transmitted to the fusion server, and the reservation conference in the second reservation conference list being created according to the reservation conference in the first reservation conference list.

S104: Establish an association relationship between the reservation conference in the first reservation conference list and a reservation conference in the second reservation conference list, and set an updated identification for each reservation conference in the first reservation conference list. For example, an association relationship is established between a meeting in the first meeting list and a meeting in the second meeting list.

Specifically, after receiving the second reservation conference list, the IM server establishes an association relationship between the reservation conference in the first reservation conference list and the reservation conference in the second reservation conference list, for example, a mapping relationship can be established. Specifically, the format of the conference identification of the reservation conference in the first reservation conference list is different from the conference identification of the reservation conference in the second reservation conference list; specifically, the reservation conference in the first reservation conference list and the reservation conference in the second reservation conference list can be associated via the conference identification and specifically can be associating conference information about two kinds of reservation conferences.

An updated identification is set for each reservation conference in the first reservation conference list; on the one hand, the reservation conference can be identified as an updated reservation conference; on the other hand, the reservation conference with the updated identification is set; and operation flows such as a subsequent conference ringing and entering a conference can all be performed via logic and data interfaces of the updated reservation conference, and specifically, see the process of S105 to S106.

In the method I and method II, further, in an implementable manner, the method of this embodiment may further include the following:

S105: Determine a conference start time arriving at a first reservation conference, the first reservation conference being any reservation conference in the first reservation conference list.

S106: Transmit, according to a second reservation conference associated with the first reservation conference in the second reservation conference list, a conference invitation ring to an IM client corresponding to a participant user of the first reservation conference, the conference invitation ring carrying a conference identification of the second reservation conference.

Specifically, the IM server sends a conference invitation ring to an IM client corresponding to a participant user (including a target user) of the first reservation conference after determining that the conference start time of the first reservation conference is reached, the conference invitation ring carrying a conference identification of the second reservation conference. Historical reservation conferences can thus be made through the logic and data interfaces of updated reservation conferences.

In the above methods, a conference invitation ring is sent to an IM client corresponding to a participant user of a first reservation conference, and conference portal information (meeting portal information) can also be sent to an IM client corresponding to a participant user of the first reservation conference, as follows:

Alternatively, S106 may also be transmitting, according to the second reservation conference associated with the first reservation conference in the second reservation conference list, conference portal information to the IM client corresponding to the participant user of the first reservation conference, the conference portal information carrying conference information about the second reservation conference.

Specifically, the conference portal information may be, for example, a conference link, a conference number, or a conference card, to facilitate a user to access a conference by clicking on the conference portal information.

In the method I and method II, further, in an implementable manner, the method of this embodiment may further include the following:

S107: Receive a reservation conference creation request transmitted by a target IM client, the reservation conference creation request carrying the identification of the target user.

S108: Transmit, in response to determining that a version of the target IM client is not the fusion conference version, indication information to the target IM client, the indication information being used for indicating the target user to upgrade the version of the target IM client.

Specifically, After updating the reservation conference in the first reservation conference list of the target user is completed, it is indicated that the IM client used by the target user is the IM client with the fusion conference version; since the target user may use different terminal devices, for example, a terminal device 1 (for example, a mobile phone) and a terminal device 2 (for example, a computer), the target user upgrades the IM client when using the terminal device 1, and the IM client has been upgraded to the IM client with the fusion conference version; and if the target user next uses the terminal device 2 to create the reservation conference, interception is required to prompt the target user to upgrade the version of the IM client. Specifically, in S107, if an IM server receives a reservation conference creation request initiated by a target user via a target IM client, it determines whether the version of the target IM client is a fusion conference version, and if not, indication information needs to be sent to the target IM client to indicate the target user to upgrade the version of the target IM client. It is convenient for users to use the conference function of the IM client with the fusion conference version.

In method III, a reservation conference is aimed at; accordingly, the acquiring a first reservation conference list of a target user being a conference creator in S101 may be specifically as follows: acquiring the target reservation conference, and determining the target reservation conference as the reservation conference in the first reservation conference list.

Accordingly, the requesting, through a fusion server, a server of the target application to create a second reservation conference list in S102 may be specifically as follows: requesting, through the fusion server, the server of the target application to create a new reservation conference (new meeting), the new reservation conference being created according to the target reservation conference, and determining the new reservation conference as the reservation conference in the second reservation conference list.

Accordingly, the establishing an association relationship between the reservation conference in the first reservation conference list and a reservation conference in the second reservation conference list in S104 may be specifically as follows: establishing an association relationship between the target reservation conference and the new reservation conference.

Alternatively, in method III, the method of the embodiment may further include the following:

transmitting, according to conference information about the new reservation conference, the conference invitation ring of the target reservation conference to the IM client, and the conference invitation ring of the target reservation conference carrying a conference identification of the new reservation conference.

The conference identification of the new reservation conference is a conference identification created by the target application, and by sending a conference invitation ring carrying the conference identification of the new reservation conference to the IM client, the IM client can be enabled to perform an enrollment flow of the new reservation conference, namely, a flow of entering a conference through the target application.

The method of the embodiment, before the requesting, through a fusion server, a server of the target application to create a second reservation conference list, may further include the following:

requesting, through the fusion server, the server of the target application to pre-register a participant user of each reservation conference in the first reservation conference list. Particularly, the IM server sends a pre-registration request for the reservation conference to the fusion server; the pre-registration request carries an identification of a participant user of the reservation conference and a conference identification of the reservation conference, for example, the identification of the participant user of the reservation conference is A, B, and C, and the conference identification of the reservation conference is 1; the fusion server sends the pre-registration request of the reservation conference to the server of the target application; and the server of the target application pre-registers the participant user of the reservation conference according to the identification of the participant user of the reservation conference and the conference identification of the reservation conference, for example, the participant users of the reservation conference A, B, and C are assigned identifications A', B', and C', respectively.

In the conference data processing method provided in the embodiment, by providing an interface for calling an SDK of a target application (the target application is an application having an audio-video conference function) in an IM client, the call of the target application by the IM client is realized, and thus when a user creates a reservation conference, the target application can be called to create the reservation conference, and the same user can view the same piece of reservation conference data in the IM client and the client of the target application. In addition, the IM server acquires a first reservation conference list created by the target user via the history of the IM client in determining that a conference data update trigger condition is satisfied; then a server requesting the target application via the fusion server creates a second reservation conference list according to the first reservation conference list, and after receiving the second reservation conference list forwarded through the fusion server, establishes an association relationship between the reservation conference in the first reservation conference list and the reservation conference in the second reservation conference list, and sets an updated identification for each reservation conference in the first reservation conference list, thereby updating the reservation conference created by the IM client before the IM client is not upgraded to the IM client with a fusion conference version to the reservation conference created by the IM client with a fusion conference version, to realize fusing conference data of two different applications with an audio-video conference function into one kind of conference data, so that the same user can view the same piece of reservation conference data in the IM client and the client of the target application. The user can select the IM client or the client of the target application to view reservation conference information or perform operations such as entering a conference according to needs to improve convenience; it is convenient for users to seamlessly use a conferencing function intercommunicated between the two applications.

A conference data processing method provided by an embodiment of this disclosure will be described in detail below with reference to a specific embodiment. The interaction process of the conference data processing method provided by an embodiment of this disclosure is described particularly with reference to FIG. 3 to FIG. 5.

Figure 3:
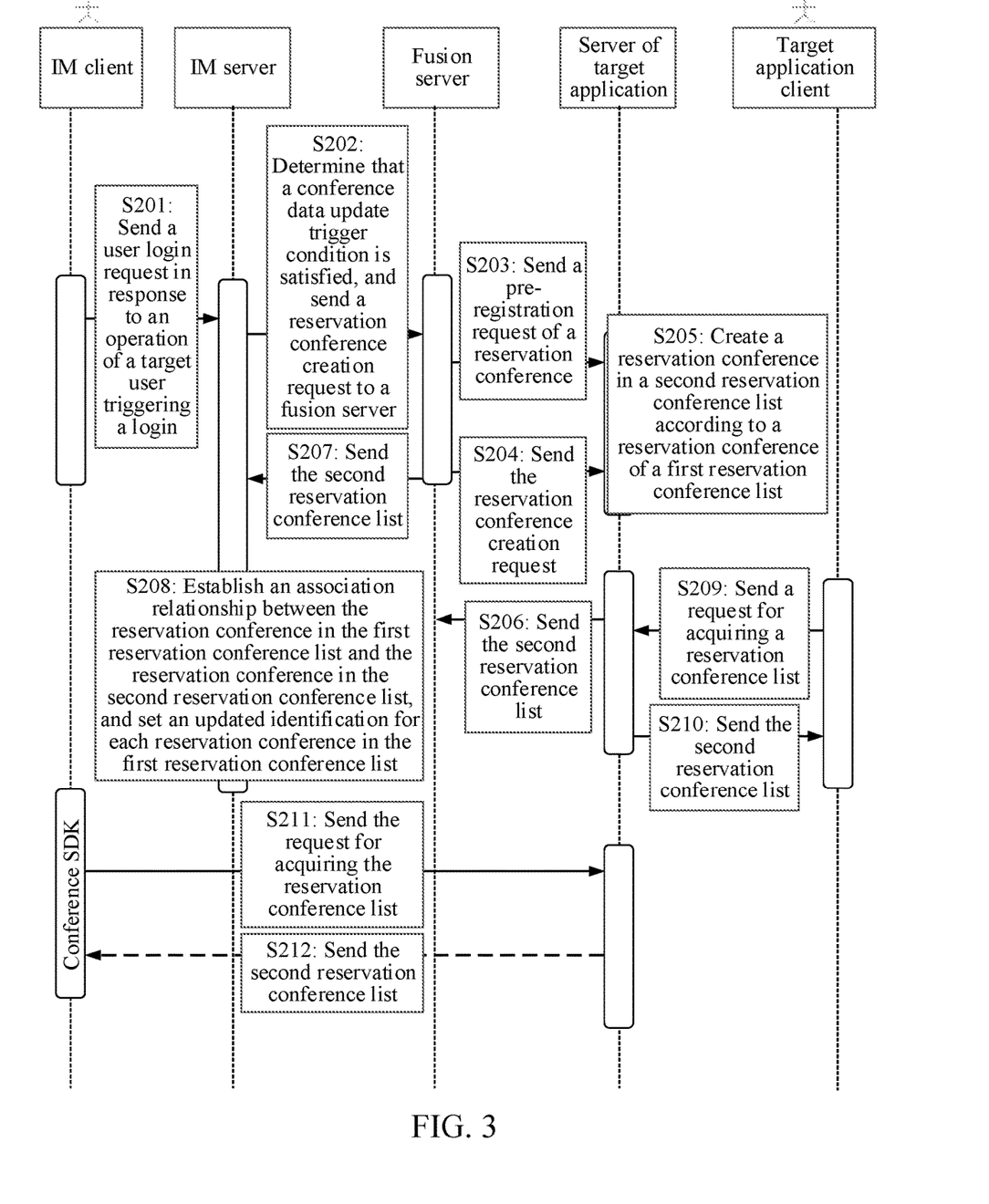
FIG. 3 is an interaction flowchart of a conference data processing method provided by an embodiment of this disclosure.

FIG. 3 is an interaction flowchart of a conference data processing method provided by an embodiment of this disclosure. As shown in FIG. 3, the method may include the following steps:

S201: An IM client sends a user login request to an IM server in response to an operation of a target user triggering a login, the user login request carrying an identification of the target user and a version of the IM client.

S202: The IM server determines that a conference data update trigger condition is satisfied in response to determining that the IM client is an IM client with a fusion conference version according to the version of the IM client, acquires a first reservation conference list of a target user being a conference creator, and sends a reservation conference creation request to the fusion server, the reservation conference creation request carrying the first reservation conference list.

Alternatively, S202 may also be as follows: The IM server determines that a conference data update trigger condition is satisfied in response to determining that the IM client is an IM client with a fusion conference version according to the version of the IM client and determining that the target user has permission of conference data update according to the identification of the target user, acquires a first reservation conference list of a target user being a conference creator, and sends a reservation conference creation request to the fusion server, the reservation conference creation request carrying the first reservation conference list.

A reservation conference in the first reservation conference list is a reservation conference created by the target user through a history of an IM client; the IM client is provided with an interface for calling an SDK of a target application; and the target application is an application with an audio-video conference function.

S203: The fusion server sends a pre-registration request of the reservation conference to the server of the target application.

Specifically, if the first reservation conference list includes a plurality of reservation conferences, a pre-registration request of a reservation conference can be sent to a server of a target application in sequence; the pre-registration request carries an identification of a participant user of the reservation conference and a conference identification of the reservation conference. It is also possible to send a pre-registration request of a plurality of reservation conferences to a server of a target application; the pre-registration request carries identification of participant users of the plurality of reservation conferences and conference identification of the plurality of reservation conferences.

S204: The fusion server sends the reservation conference creation request to the server of the target application, the reservation conference creation request carrying a first reservation conference list.

S205: The server of the target application creates a reservation conference in the second reservation conference list according to the reservation conference of the first reservation conference list.

S206: The server of the target application sends a second reservation conference list to the fusion server.

S207: The fusion server sends the second reservation conference list to the IM server.

S208: The IM server establishes an association relationship between the reservation conference in the first reservation conference list and the reservation conference in the second reservation conference list, and sets an updated identification for each reservation conference in the first reservation conference list.

The method of this embodiment may further include the following:

S209: The target application client, in response to an operation of the user triggering the reservation conference list, sends a request for acquiring a reservation conference list to the server of the target application.

S210: The server of the target application, after receiving the request for acquiring the reservation conference list, sends a second reservation conference list to the client of the target application.

The method of this embodiment may further include the following:

S211: The IM client, in response to an operation of the user triggering the reservation conference list, sends the request for acquiring the reservation conference list to the server of the target application.

S212: The server of the target application, after receiving the request for acquiring the reservation conference list, sends a second reservation conference list to the IM client.

The method of this embodiment may further include the following:

S213: Determine a conference start time arriving at a first reservation conference, the first reservation conference being any reservation conference in the first reservation conference list.

S214: Transmit, according to a second reservation conference associated with the first reservation conference in the second reservation conference list, a conference invitation ring to an IM client corresponding to a participant user of the first reservation conference, the conference invitation ring carrying a conference identification of the second reservation conference.

Alternatively, S214 may also be transmitting, according to the second reservation conference associated with the first reservation conference in the second reservation conference list, conference portal information to the IM client corresponding to the participant user of the first reservation conference, the conference portal information carrying conference information about the second reservation conference.

Figure 4:
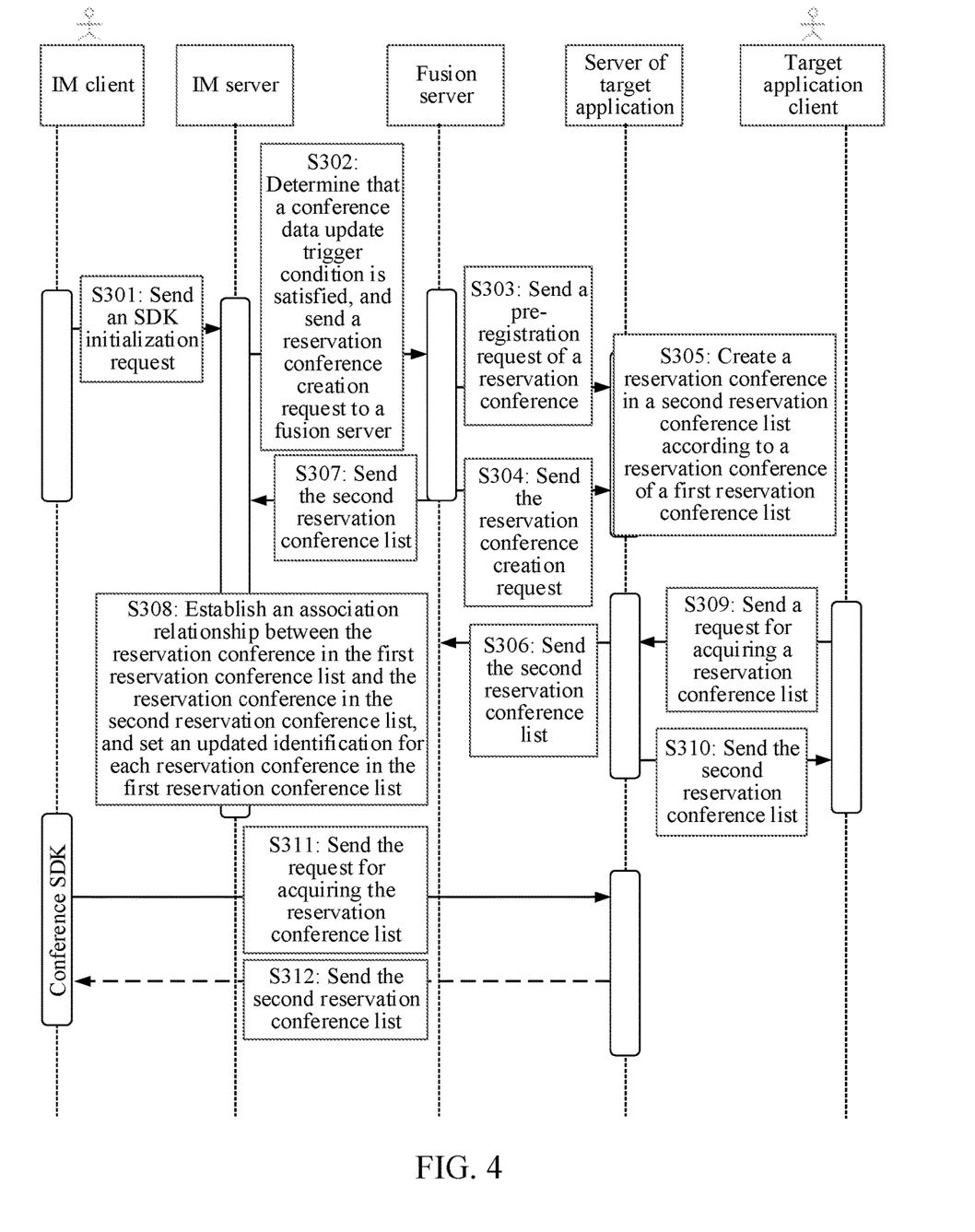
FIG. 4 is an interaction flowchart of a conference data processing method provided by an embodiment of this disclosure.

FIG. 4 is an interaction flowchart of a conference data processing method provided by an embodiment of this disclosure. As shown in FIG. 4, the method may include the following steps:

S301: An IM client sends an SDK initialization request to the IM server, the SDK initialization request carrying an identification of the target user.

S302: The IM server determines that a conference data update trigger condition is satisfied in response to determining that the IM client is an IM client with a fusion conference version according to the SDK initialization request, acquires a first reservation conference list of a target user being a conference creator, and sends a reservation conference creation request to the fusion server, the reservation conference creation request carrying the first reservation conference list.

Alternatively, S302 may also be as follows: The IM server determines that a conference data update trigger condition is satisfied in response to determining that the IM client is an IM client with a fusion conference version according to the SDK initialization request and determining that the target user has permission of conference data update according to the identification of the target user, acquires a first reservation conference list of a target user being a conference creator, and sends a reservation conference creation request to the fusion server, the reservation conference creation request carrying the first reservation conference list.

S303 to S311 are the same as S203 to S211 and will not be described again herein.

Figure 5:
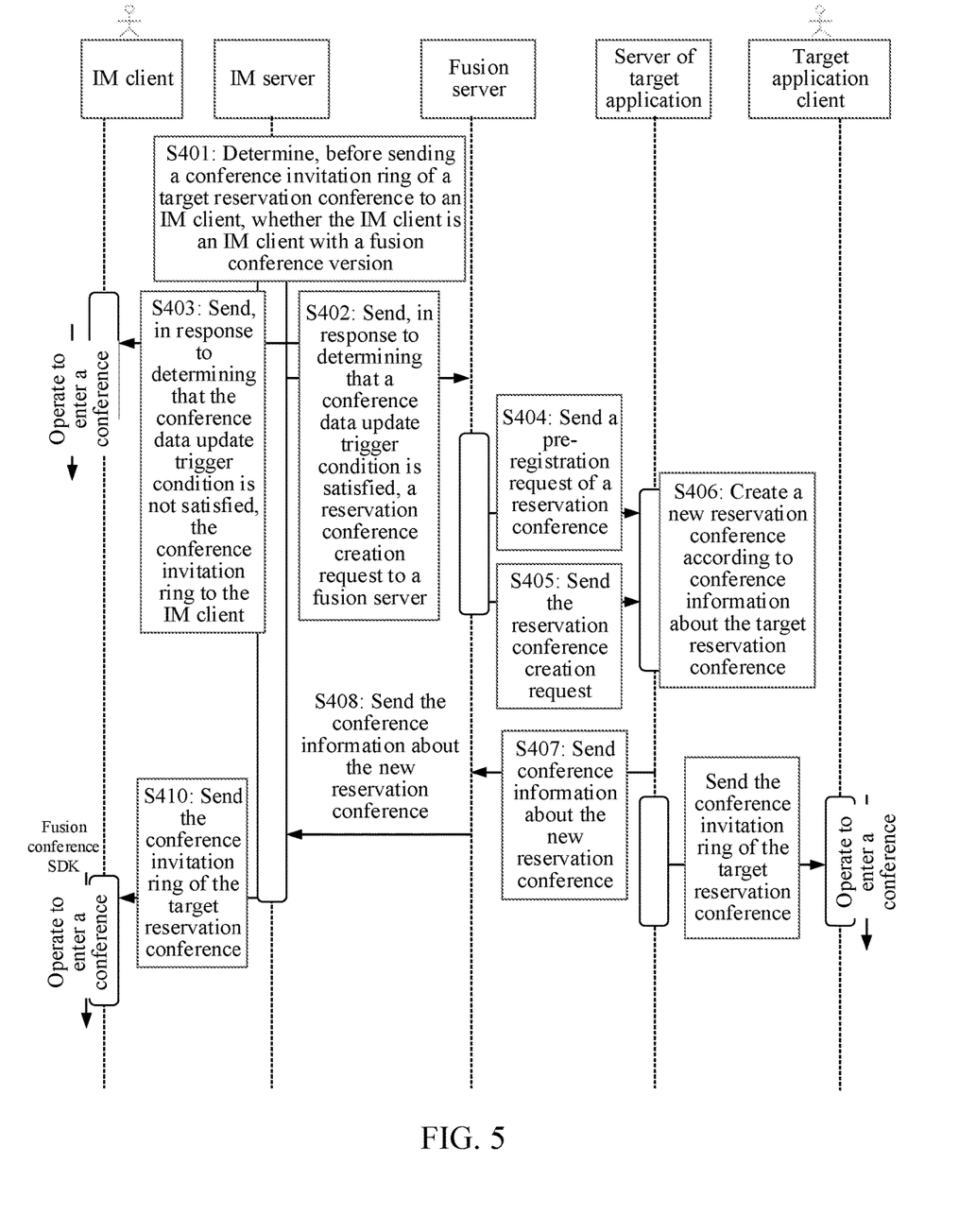
FIG. 5 is an interaction flowchart of a conference data processing method provided by an embodiment of this disclosure.

FIG. 5 is an interaction flowchart of a conference data processing method provided by an embodiment of this disclosure. As shown in FIG. 5, the method may include the following steps:

S401: An IM server determines whether a conference data update trigger condition is satisfied before sending a conference invitation ring of the target reservation conference to the IM client, the target reservation conference being a reservation conference arriving at a conference start time.

Specifically, it is determined whether the IM client is an IM client with a fusion conference version, and if so, determining that a conference data update trigger condition is satisfied. Alternatively, it is determined that the conference data update trigger condition is satisfied in response to determining that the IM client is the IM client with the fusion conference version and determining that the target user has permission of conference data update.

S402: Acquire, in response to determining that a conference data update trigger condition is satisfied, conference information about a target reservation conference, and send a reservation conference creation request to the fusion server, the reservation conference creation request carrying conference information about the target reservation conference.

S403: Send, in response to determining that a conference data update trigger condition is not satisfied, a conference invitation ring to the IM client, the conference invitation ring carrying the conference identification of the target reservation conference.

Specifically, after receiving the conference invitation ring, the IM client can display a conference invitation interface, and a user can access a conference (namely, entering a conference) by operating the conference invitation interface.

S404: The fusion server sends a pre-registration request of the target reservation conference to the server of the target application.

Specifically, the pre-registration request of the target reservation conference carries an identification of a participant user of the target reservation conference and a conference identification of the target reservation conference.

S405: The fusion server sends a reservation conference creation request to the server of the target application, the reservation conference creation request carrying conference information about the target reservation conference.

S406: The server of the target application creates a new reservation conference according to the conference information about the target reservation conference.

S407: The server of the target application sends conference information about the new reservation conference to the fusion server.

S408: The fusion server sends the conference information about the new reservation conference to the IM server.

S409: The IM server establishes an association relationship between the target reservation conference and the new reservation conference, and sets an updated identification for the new reservation conference.

The method of this embodiment may further include the following:

S410: Transmit, according to conference information about the new reservation conference, the conference invitation ring of the target reservation conference to the IM client, the conference invitation ring of the target reservation conference carrying a conference identification of the new reservation conference.

Specifically, after receiving the conference invitation ring of the target reservation conference, the IM client can display a conference invitation interface, and the user can access the conference (namely, entering the conference) by operating the conference invitation interface. The user may also operate the target application client to access the conference.

Figure 6:
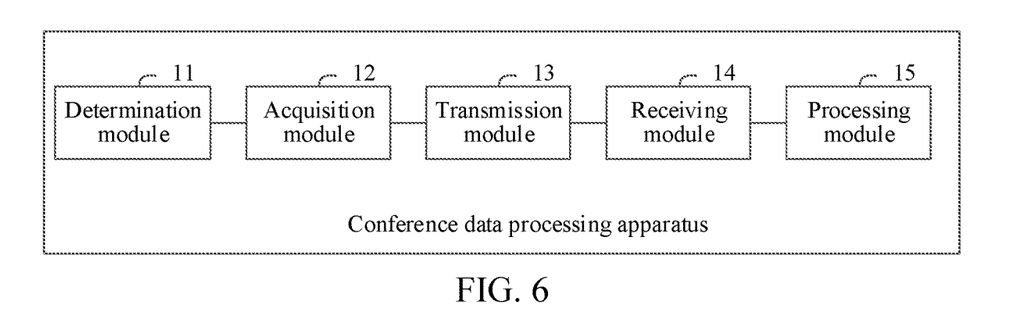
FIG. 6 is a structural diagram of a conference data processing apparatus provided by an embodiment of this disclosure.

FIG. 6 is a structural diagram of a conference data processing apparatus provided by an embodiment of this disclosure. As shown in FIG. 6, the apparatus may include a determination module 11, an acquisition module 12, a transmission module 13, a receiving module 14, and a processing module 15.

The determination module 11 is configured to determine that a conference data update trigger condition is satisfied.

The acquisition module 12 is configured to acquire a first reservation conference list of a target user being a conference creator, a reservation conference in the first reservation conference list being a reservation conference created by the target user through a history of an IM client, the IM client being provided with an interface for calling an SDK of a target application, and the target application being an application with an audio-video conference function.

The transmission module 13 is configured to request, through a fusion server, a server of the target application to create a second reservation conference list, the second reservation conference list being created according to the first reservation conference list.

The receiving module 14 is configured to receive, through the fusion server, the second reservation conference list transmitted by the server of the target application.

The processing module 15 is configured to establish an association relationship between the reservation conference in the first reservation conference list and a reservation conference in the second reservation conference list, and set an updated identification for each reservation conference in the first reservation conference list.

In an embodiment, the transmission module 13 is configured to transmit a reservation conference creation request to the fusion server to cause the fusion server to transmit the reservation conference creation request to the server of the target application, the reservation conference creation request carrying the first reservation conference list.

The receiving module 14 is configured to receive the second reservation conference list transmitted through the fusion server, the second reservation conference list being created for the server of the target application before being transmitted to the fusion server, and the reservation conference in the second reservation conference list being created according to the reservation conference in the first reservation conference list.

In an embodiment, the determination module 11 is configured to: determine that a conference data update trigger condition is satisfied in response to the receiving module 14 receiving a user login request sent by an IM client, the user login request carrying an identification of a target user and a version of the IM client and determining that the IM client is an IM client with a fusion conference version according to the version of the IM client; or determine that the conference data update trigger condition is satisfied in response to determining that the IM client is the IM client with the fusion conference version according to the version of the IM client and determining that the target user has permission of conference data update according to the identification of the target user.

In an embodiment, the determination module 11 is configured to: receive an SDK initialization request transmitted by the IM client at the receiving module 14, the SDK initialization request carrying an identification of the target user;
determine that the conference data update trigger condition is satisfied in response to determining that the IM client is an IM client with a fusion conference version according to the SDK initialization request;
or determine that the conference data update trigger condition is satisfied in response to determining that the IM client is the IM client with the fusion conference version according to the SDK initialization request and determining that the target user has permission of conference data update according to the identification of the target user.

In an embodiment, the determination module 11 is further configured to determine a conference start time arriving at a first reservation conference, the first reservation conference being any reservation conference in the first reservation conference list.

The transmission module 13 is further configured to transmit, according to a second reservation conference associated with the first reservation conference in the second reservation conference list, a conference invitation ring to an IM client corresponding to a participant user of the first reservation conference, the conference invitation ring carrying a conference identification of the second reservation conference.

Alternatively, it transmits, according to the second reservation conference associated with the first reservation conference in the second reservation conference list, conference portal information to the IM client corresponding to the participant user of the first reservation conference, the conference portal information carrying conference information about the second reservation conference.

In an embodiment, the receiving module 14 is further configured to receive a reservation conference creation request transmitted by a target IM client, the reservation conference creation request carrying the identification of the target user.

The transmission module 13 is further configured to transmit, in response to the determination module 11 determining that a version of the target IM client is not the fusion conference version, indication information to the target IM client, the indication information being used for indicating the target user to upgrade the version of the target IM client.

In an embodiment, the determination module 11 is configured to: determine, before the transmission module 13 transmitting a conference invitation ring of a target reservation conference to the IM client, whether the IM client is an IM client with a fusion conference version, the target reservation conference being a reservation conference arriving at a conference start time; and if it is determined that the IM client is an IM client with a fusion conference version, it is determined that a conference data update trigger condition is satisfied; or determine that the conference data update trigger condition is satisfied in response to determining that the IM client is the IM client with the fusion conference version and determining that the target user has permission of conference data update.

In an embodiment, the acquisition module 12 is specifically configured to acquire the target reservation conference, and determine the target reservation conference as the reservation conference in the first reservation conference list.

The transmission module 13 is specifically configured to request, through the fusion server, the server of the target application to create a new reservation conference, the new reservation conference being created according to the target reservation conference, and determine the new reservation conference as the reservation conference in the second reservation conference list.

The processing module 15 is specifically configured to establish an association relationship between the target reservation conference and the new reservation conference.

In an embodiment, the transmission module 13 is further configured to transmit, according to conference information about the new reservation conference, the conference invitation ring of the target reservation conference to the IM client, the conference invitation ring of the target reservation conference carrying a conference identification of the new reservation conference.

In an embodiment, the transmission module 13 is further configured to request, through the fusion server, the server of the target application to pre-register a participant user of each reservation conference in the first reservation conference list before requesting, through the fusion server, the server of the target application to create the second reservation conference list.

It is to be understood that apparatus embodiments and method embodiments may correspond to each other and that similar descriptions may refer to method embodiments. In order to avoid repetition, it will not be repeated here. Specifically, the apparatus shown in FIG. 6 may perform a corresponding method embodiment of an IM server, and the foregoing and other operations and/or functions of the various modules in the apparatus shown in FIG. 6, respectively, in order to implement a corresponding method embodiment of an IM server, will not be described in detail herein for the sake of brevity.

The conference data processing apparatus of an embodiment of this disclosure is described above from the perspective of functional modules in conjunction with the drawings. It is to be understood that the functional modules may be implemented as hardware, as instructions in software, or as a combination of hardware and software modules. Specifically, the steps of a method embodiment in an embodiment of this disclosure may be performed by instructions in the form of integrated logic circuits in hardware and/or software in a processor; and the steps of a method disclosed in connection with the embodiment of this disclosure may be directly embodied in execution by a hardware decoding processor, or may be performed by a combination of hardware and software modules in a decoding processor. A software module may reside in a random-access memory, a flash memory, a read-only memory, a programmable read-only memory, an electrically erasable programmable memory, a register, and other mature storage media in the art. The storage medium is located at a memory, and the processor reads the information in the memory and, in conjunction with its hardware, performs the steps in the above method embodiments.

Figure 7:
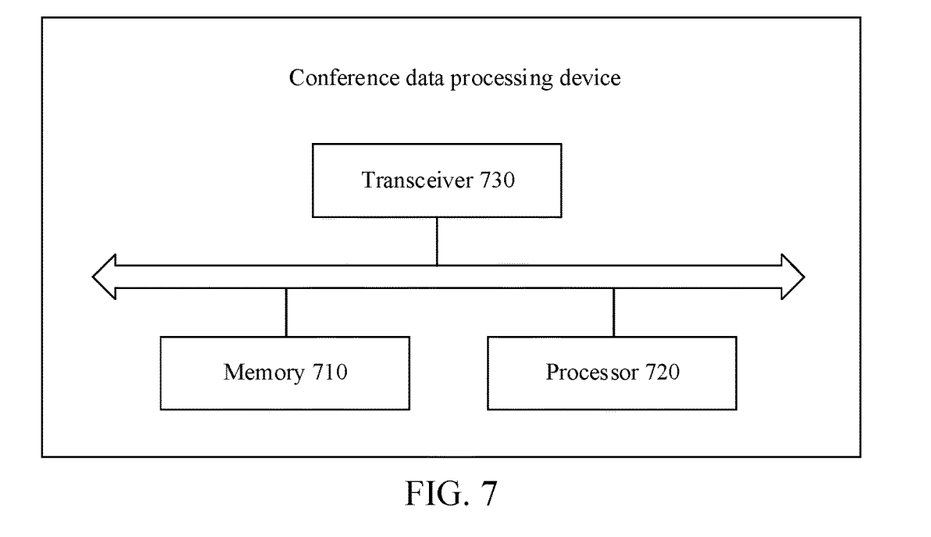
FIG. 7 is an exemplary block diagram of a conference data processing device provided by an embodiment of this disclosure.

FIG. 7 is an exemplary block diagram of a conference data processing device provided by an embodiment of this disclosure.

As shown in FIG. 7, the conference data processing device may include:
a memory 710 (non-transitory computer-readable storage medium) and a processor 720 (processing circuitry), the memory 710 is configured to store computer programs and transmitting the computer programs to the processor 720. In other words, the processor 720 may call and run the computer programs from the memory 710 to implement the methods in embodiments of this disclosure.

For example, the processor 720 may be configured to perform the above method embodiments according to instructions in the computer programs.

In some embodiments of this disclosure, the processor 720 may include, but is not limited to:
a general-purpose processor, a digital signal processor (DSP), an application specific integrated circuit (ASIC), a field programmable gate array (FPGA), other programmable logic device, a discrete gate, a transistor logic device, or a discrete hardware assembly.

In some embodiments of this disclosure, the memory 710 includes, but is not limited to:
a volatile memory and/or a nonvolatile memory. The nonvolatile memory may be a read-only memory (ROM), a programmable ROM (PROM), an erasable PROM (EPROM), an electrically EPROM (EEPROM), or a flash memory. The volatile memory may be a random-access memory (RAM) serving as an external cache. By way of illustration and not limitation, many forms of RAM are available such as a static RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM), and a direct rambus RAM (DR RAM).

In some embodiments of this disclosure, the computer programs may be partitioned into one or more modules that are stored in the memory 710 and executed by the processor 720 to perform the methods provided by this disclosure. The one or more modules may be a series of computer program instruction segments capable of performing specific functions, the instruction segments describing the execution of the computer programs in the conference data processing device.

As shown in FIG. 7, the conference data processing device may further include:
a transceiver 730, the transceiver 730 capable of being connected to the processor 720 or the memory 710.

The processor 720 can control the transceiver 730 to communicate with other devices; particularly, information or data may be sent to or received from other devices. The transceiver 730 may include a transmitter and a receiver. The transceiver 730 may further include antennas, and the number of antennas may be one or more.

It will be appreciated that the various assemblies of the conference data processing device are connected by a bus system which includes, in addition to a data bus, a power bus, a control bus, and a status signal bus.

This disclosure also provides a computer storage medium storing thereon computer programs, the computer programs, when executed by a computer, causing the computer to execute the methods of the above method embodiments. Stated alternatively, embodiments of this disclosure also provide a computer program product including instructions which, when executed by a computer, cause the computer to execute the methods of the above method embodiments.

When implemented in software, it may be implemented in whole or in part as a computer program product. The computer program product includes one or more computer instructions. The computer program instructions, when loaded and executed on a computer, result, in whole or in part, in processes or functions according to embodiments of this disclosure. The computer may be a general-purpose computer, a special-purpose computer, a computer network, or other programmable apparatus. The computer instructions may be stored in a non-transitory computer-readable storage medium or transmitted from one computer-readable storage medium to another computer-readable storage medium. For example, the computer instructions may be transmitted from one website, computer, server, or data center to another website, computer, server, or data center via a wired (for example, coaxial cable, fiber optic, and digital subscriber line, (DSL)) or wireless (for example, infrared, wireless, and microwave) manner. The computer-readable storage medium can be any available medium that can be accessed by a computer or a data storage device including a server and a data center integrated with one or more available media.

The available medium may be a magnetic medium (for example, a floppy disk, a hard disk, and a magnetic tape), an optical medium (for example, a digital video disc (DVD)), or a semiconductor medium (for example, a solid-state disk (SSD)).

The ordinarily skilled in the art may notice that the exemplary modules and algorithm steps described with reference to the embodiments disclosed in this specification can be implemented in electronic hardware or a combination of computer software and electronic hardware. Whether such functions are implemented as hardware or software depends upon the specific application and design constraints imposed on the technical solutions. Skilled artisans may implement the described functions in varying ways for each specific application, but such implementations are not to be interpreted as causing a departure from the scope of this disclosure.

In the several embodiments provided in this disclosure, it is to be understood that the disclosed system, apparatus, and method may be implemented in other manners. For example, the apparatus embodiments described above are merely illustrative, for example, the partitioning of modules is merely a logical functional partitioning, and in actual implementation there may be additional partitioning, for example, a plurality of modules or assemblies may be combined or integrated into another system, or some features may be omitted, or not performed. In another aspect, the couplings or direct couplings or communication connections shown or discussed with respect to each other may be indirect couplings or communication connections through some interface, device, or module, and may be electrical, mechanical, or otherwise.

The modules illustrated as separate components may or may not be physically separated, the components shown as modules may or may not be physical modules, that is, may be located at one place, or may also be distributed over a plurality of network units. Some or all the modules may be selected according to actual needs to achieve the purpose of the solution of the embodiment. For example, each functional module in various embodiments of this disclosure may be integrated in one processing module, may each module physically exist separately, or may two or more modules be integrated in one module.

The use of "at least one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof.

The foregoing disclosure includes some exemplary embodiments of this disclosure which are not intended to limit the scope of this disclosure. Other embodiments shall also fall within the scope of this disclosure.

What is claimed is:

1. A conference data processing method, comprising:
    acquiring a first meeting list of meetings created by a user, meetings in the first meeting list having been created by the user through an instant messaging (IM) client, the IM client including an interface for calling a software development kit (SDK) of a separate conference application implementing at least one of audio or video conferencing;
    requesting, through a fusion server, a server of the conference application to create a second meeting list according to the first meeting list;
    receiving, through the fusion server, the second meeting list transmitted by the server of the conference application, the second meeting list including meetings that correspond respectively to the meetings in the first meeting list; and
    establishing an association relationship between a meeting in the first meeting list and a meeting in the second meeting list.

2. The method according to claim 1, wherein
    the requesting, through the fusion server, the server of the conference application to create the second meeting list comprises:
        transmitting a meeting creation request to the fusion server to cause the fusion server to transmit the meeting creation request to the server of the conference application, the meeting creation request including the first meeting list; and
    the receiving, through the fusion server, the second meeting list comprises:
        receiving the second meeting list transmitted through the fusion server, the second meeting list having been created by the server of the conference application before being transmitted to the fusion server, and the meeting in the second meeting list having been created according to the meeting in the first meeting list.

3. The method according to claim 1, wherein the acquiring the first meeting list is performed in response to determining that a conference data update trigger condition is satisfied, the determining comprises:
    receiving a user login request transmitted by the IM client, the user login request carrying an identification of the user and a version of the IM client; and
        (i) determining that the conference data update trigger condition is satisfied in response to determining that the IM client is an IM client with a fusion conference version according to the version of the IM client, the IM client with the fusion conference version including the interface for calling the SDK of the separate conference application; or
        (ii) determining that the conference data update trigger condition is satisfied in response to determining that the IM client is the IM client with the fusion conference version according to the version of the IM client and determining that the user has permission to implement a conference data update.

4. The method according to claim 1, wherein the acquiring the first meeting list is performed in response to determining that a conference data update trigger condition is satisfied, the determining comprises:
    receiving an SDK initialization request transmitted by the IM client, the SDK initialization request carrying an identification of the user; and
        (i) determining that the conference data update trigger condition is satisfied in response to determining that the IM client is an IM client with a fusion conference version according to the SDK initialization request, the IM client with the fusion conference version including the interface for calling the SDK of the separate conference application; or
        (ii) determining that the conference data update trigger condition is satisfied in response to determining that the IM client is the IM client with the fusion conference version according to the SDK initialization request and determining that the user has permission to implement a conference data update.

5. The method according to claim 3, further comprising:
    determining that a current time is a meeting start time of a first meeting in the first meeting list;

(i) transmitting, according to a second meeting in the second meeting list associated with the first meeting, a meeting invitation to an IM client corresponding to a participant user of the first meeting, the meeting invitation including a meeting identification of the second meeting; or (ii) transmitting, according to the second meeting associated with the first meeting, meeting portal information to the IM client corresponding to the participant user of the first meeting, the meeting portal information including meeting information about the second meeting.

6. The method according to claim 3, further comprising:
receiving a meeting creation request transmitted by an IM client of a second user; and
transmitting, in response to a determination that a version of the IM client of the second user is not the fusion conference version, a notice to the IM client of the second user to upgrade the version of the IM client of the second user.

7. The method according to claim 1, wherein the acquiring the first meeting list is performed in response to determining that a conference data update trigger condition is satisfied, the determining comprises:
determining, before transmitting a meeting invitation of a target meeting to the IM client, whether the IM client is an IM client with a fusion conference version, the target meeting having an upcoming conference start time, and the IM client with the fusion conference version including the interface for calling the SDK of the separate conference application;
(i) determining that the conference data update trigger condition is satisfied in response to determining that the IM client is the IM client with the fusion conference version; or
(ii) determining that the conference data update trigger condition is satisfied in response to determining that the IM client is the IM client with the fusion conference version and determining that the user has permission to implement a conference data update.

8. The method according to claim 7, wherein
the acquiring the first meeting list comprises:
acquiring the target meeting, and determining the target meeting as the meeting in the first meeting list;
the requesting, through the fusion server, the server of the conference application to create the second meeting list comprises:
requesting, through the fusion server, the server of the conference application to create a new meeting, the new meeting being created according to the target meeting, and
determining the new meeting as the meeting in the second meeting list; and
the establishing the association relationship between the meeting in the first meeting list and the meeting in the second meeting list comprises:
establishing an association relationship between the target meeting and the new meeting.

9. The method according to claim 8, further comprising:
transmitting, according to meeting information of the new meeting, the meeting invitation of the target meeting to the IM client, the meeting invitation of the target meeting including meeting identification of the new meeting.

10. The method according to claim 1, further comprising:
requesting, through the fusion server, the server of the conference application to pre-register a participant user of each meeting in the first meeting list.

11. A non-transitory computer-readable storage medium storing computer-readable instructions thereon, which, when executed by processing circuitry, cause the processing circuitry to perform a conference data processing method comprising:
acquiring a first meeting list of meetings created by a user, meetings in the first meeting list having been created by the user through an instant messaging (IM) client, the IM client including an interface for calling a software development kit (SDK) of a separate conference application implementing at least one of audio or video conferencing;
requesting, through a fusion server, a server of the conference application to create a second meeting list according to the first meeting list;
receiving, through the fusion server, the second meeting list transmitted by the server of the conference application, the second meeting list including meetings that correspond respectively to the meetings in the first meeting list; and
establishing an association relationship between a meeting in the first meeting list and a meeting in the second meeting list.

12. A conference data processing apparatus, comprising:
processing circuitry configured to
acquire a first meeting list of meetings created by a user, a meetings in the first meeting list having been created by the user through an instant messaging (IM) client, the IM client including an interface for calling a software development kit (SDK) of a separate conference application implementing at least one of audio or video conferencing;
request, through a fusion server, a server of the conference application to create a second meeting list according to the first meeting list;
receive, through the fusion server, the second meeting list transmitted by the server of the conference application, the second meeting list including meetings that correspond respectively to the meetings in the first meeting list; and
establish an association relationship between a meeting in the first meeting list and a meeting in the second meeting list.

13. The apparatus according to claim 12, wherein
the processing circuitry is further configured to:
transmit a meeting creation request to the fusion server to cause the fusion server to transmit the meeting creation request to the server of the conference application, the meeting creation request including the first meeting list; and
receive the second meeting list transmitted through the fusion server, the second meeting list having been created by the server of the conference application before being transmitted to the fusion server, and the meeting in the second meeting list having been created according to the meeting in the first meeting list.

14. The apparatus according to claim 12, wherein the processing circuitry is further configured to:
acquire the first meeting list in response to determining that a conference data update trigger condition is satisfied;

receive a user login request transmitted by the IM client, the user login request carrying an identification of the user and a version of the IM client; and
  (i) determine that the conference data update trigger condition is satisfied in response to determining that the IM client is an IM client with a fusion conference version according to the version of the IM client, the IM client with the fusion conference version including the interface for calling the SDK of the separate conference application; or
  (ii) determine that the conference data update trigger condition is satisfied in response to determining that the IM client is the IM client with the fusion conference version according to the version of the IM client and determining that the user has permission to implement a conference data update.

15. The apparatus according to claim 14, wherein the processing circuitry is further configured to:
determine that a current time is a meeting start time of a first meeting in the first meeting list;
  (i) transmit, according to a second meeting in the second meeting list associated with the first meeting, a meeting invitation to an IM client corresponding to a participant user of the first meeting, the meeting invitation including a meeting identification of the second meeting; or
  (ii) transmit, according to the second meeting associated with the first meeting, meeting portal information to the IM client corresponding to the participant user of the first meeting, the meeting portal information including meeting information about the second meeting.

16. The apparatus according to claim 14, wherein the processing circuitry is further configured to:
receive a meeting creation request transmitted by an IM client of a second user; and
transmit, in response to a determination that a version of the IM client of the second user is not the fusion conference version, a notice to the IM client of the second user to upgrade the version of the IM client of the second user.

17. The apparatus according to claim 12, wherein the processing circuitry is further configured to:
acquire the first meeting list in response to determining that a conference data update trigger condition is satisfied;
receive an SDK initialization request transmitted by the IM client, the SDK initialization request carrying an identification of the user; and
  (i) determine that the conference data update trigger condition is satisfied in response to determining that the IM client is an IM client with a fusion conference version according to the SDK initialization request, the IM client with the fusion conference version including the interface for calling the SDK of the separate conference application; or
  (ii) determine that the conference data update trigger condition is satisfied in response to determining that the IM client is the IM client with the fusion conference version according to the SDK initialization request and determining that the user has permission to implement a conference data update.

18. The apparatus according to claim 12, wherein the processing circuitry is further configured to:
acquire the first meeting list in response to determining that a conference data update trigger condition is satisfied;
determine, before transmitting a meeting invitation of a target meeting to the IM client, whether the IM client is an IM client with a fusion conference version, the target meeting having an upcoming conference start time, and the IM client with the fusion conference version including the interface for calling the SDK of the separate conference application; and
  (i) determine that the conference data update trigger condition is satisfied in response to determining that the IM client is the IM client with the fusion conference version; or
  (ii) determine that the conference data update trigger condition is satisfied in response to determining that the IM client is the IM client with the fusion conference version and determining that the user has permission to implement a conference data update.

19. The apparatus according to claim 18, wherein the processing circuitry is further configured to:
acquire the target meeting, and determine the target meeting as the meeting in the first meeting list;
request, through the fusion server, the server of the conference application to create a new meeting, the new meeting being created according to the target meeting, and determine the new meeting as the meeting in the second meeting list; and
establish an association relationship between the target meeting and the new meeting.

20. The apparatus according to claim 19, wherein the processing circuitry is further configured to:
transmit, according to meeting information of the new meeting, the meeting invitation of the target meeting to the IM client, the meeting invitation of the target meeting including meeting identification of the new meeting.

* * * * *